US009066004B2

(12) United States Patent
Suto

(10) Patent No.: US 9,066,004 B2
(45) Date of Patent: *Jun. 23, 2015

(54) AUTO-FOCUS APPARATUS, IMAGE PICK-UP APPARATUS, AND AUTO-FOCUS METHOD FOR FOCUSING USING EVALUATION VALUES

(71) Applicant: Sony Corporation, Tokyo (JP)

(72) Inventor: Hidekazu Suto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,893

(22) Filed: Feb. 4, 2013

(65) Prior Publication Data
US 2013/0141631 A1 Jun. 6, 2013

Related U.S. Application Data

(63) Continuation of application No. 12/100,588, filed on Apr. 10, 2008, now Pat. No. 8,373,790.

(30) Foreign Application Priority Data

Apr. 12, 2007 (JP) ................. 2007-105065

(51) Int. Cl.
*H04N 5/232* (2006.01)
*G02B 7/36* (2006.01)
*G03B 13/36* (2006.01)

(52) U.S. Cl.
CPC ............ *H04N 5/23212* (2013.01); *G03B 13/36* (2013.01); *G02B 7/365* (2013.01)

(58) Field of Classification Search
CPC ... H04N 5/2356; H04N 5/23212; G03B 3/00; G03B 3/02; G03B 3/04; G03B 3/06; G03B 3/10; G03B 3/12; G03B 13/32; G03B 13/34; G03B 13/36; G01C 3/32

USPC ................................. 348/345–357
See application file for complete search history.

(56) References Cited

U.S. PATENT DOCUMENTS

| 4,166,783 A | 9/1979 | Turner |
| 6,428,663 B1 | 8/2002 | Mostovoy et al. |

(Continued)

FOREIGN PATENT DOCUMENTS

| EP | 0 667 546 | 8/1995 |
| EP | 1 521 457 | 4/2005 |

(Continued)

OTHER PUBLICATIONS

Japanese Office Action dated Jan. 17, 2012, issued in corresponding Japanese Patent Application No. 2006-087957.

(Continued)

*Primary Examiner* — Timothy J Henn
*Assistant Examiner* — Pritham Prabhakher
(74) *Attorney, Agent, or Firm* — Frommer Lawrence & Haug LLP; William S. Frommer; Ellen Marcie Emas

(57) ABSTRACT

Disclosed is an auto-focus apparatus utilized for an image pickup apparatus having a focus ring. The auto-focus apparatus includes an evaluation value calculator periodically calculating a plurality of evaluation values for a plurality of areas of a subject image based on high frequency components of image signals of the plurality of areas of the subject image; and a control unit, after detecting that the focus ring has been stopped, performing image processing on an area of the subject image where fluctuations of the evaluation values obtained just before the focus ring has been stopped exhibit a predetermined history, based on an evaluation value obtained in the area of the subject image exhibiting the predetermined history, and outputting instruction signals for moving a focus lens base on a peak of the evaluation values obtained by the image processing.

1 Claim, 6 Drawing Sheets

(56) References Cited

U.S. PATENT DOCUMENTS

| | | |
|---|---|---|
| 6,468,403 B1 | 10/2002 | Shimizu et al. |
| 6,545,856 B1 | 4/2003 | Norga et al. |
| 6,624,458 B2 | 9/2003 | Takamatsu et al. |
| 7,330,212 B2 * | 2/2008 | Tomita .................. 348/345 |
| 7,932,949 B2 * | 4/2011 | Hyodo .................. 348/345 |
| 2001/0028402 A1 | 10/2001 | Sugimoto et al. |
| 2001/0050718 A1 | 12/2001 | Ito |
| 2003/0174414 A1 | 9/2003 | Sasaki |
| 2004/0201770 A1 * | 10/2004 | Sawachi .................. 348/350 |
| 2005/0083428 A1 * | 4/2005 | Ohkawara .................. 348/345 |
| 2005/0094023 A1 * | 5/2005 | Natsume et al. .............. 348/345 |
| 2005/0110890 A1 * | 5/2005 | Sasaki et al. .................. 348/345 |
| 2005/0133361 A1 | 6/2005 | Ding et al. |
| 2005/0219403 A1 * | 10/2005 | Hyodo .................. 348/349 |
| 2005/0271373 A1 * | 12/2005 | Tomita .................. 396/103 |
| 2007/0071432 A1 | 3/2007 | Senba |
| 2008/0278618 A1 * | 11/2008 | Matsumoto et al. .......... 348/345 |
| 2009/0102960 A1 * | 4/2009 | Tsuchiya .................. 348/345 |
| 2009/0115883 A1 * | 5/2009 | Tsuchiya .................. 348/345 |

FOREIGN PATENT DOCUMENTS

| | | |
|---|---|---|
| JP | 05-132771 | 5/1993 |
| JP | 05-263236 | 10/1993 |
| JP | 6-88221 | 3/1994 |
| JP | 7-116602 | 12/1995 |
| JP | 08-029667 | 2/1996 |
| JP | 2688872 | 12/1997 |
| JP | 10-051675 | 2/1998 |
| JP | 10-176264 | 6/1998 |
| JP | 10-213736 | 8/1998 |
| JP | 2000-345335 | 12/2000 |
| JP | 3122421 | 1/2001 |
| JP | 2001-085504 | 3/2001 |
| JP | 2001-158960 | 6/2001 |
| JP | 2001-189313 | 7/2001 |
| JP | 2001-270795 | 10/2001 |
| JP | 2002-294443 | 10/2002 |
| JP | 2002-294444 | 10/2002 |
| JP | 2003-241066 | 8/2003 |
| JP | 2003-241077 | 8/2003 |
| JP | 3526342 | 5/2004 |
| JP | 2005-345911 | 12/2005 |
| WO | 2004/053991 A1 | 6/2004 |

OTHER PUBLICATIONS

Machine Translation to Tsuji, (JP06-0088221), published Mar. 29, 1994.

Machine Translation to Sakai (JP10-176264) published Jun. 1998.

* cited by examiner

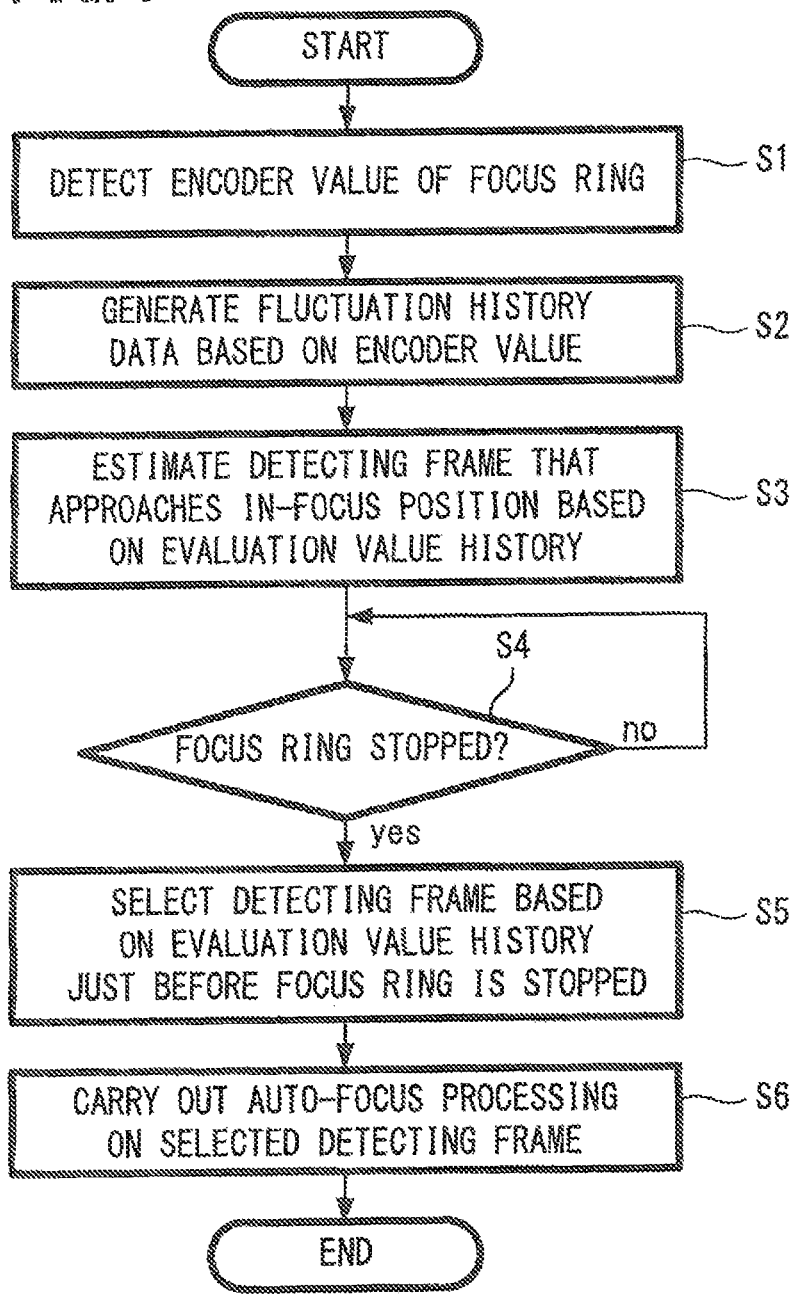

AUTO-FOCUS APPARATUS, IMAGE PICK-UP APPARATUS, AND AUTO-FOCUS METHOD FOR FOCUSING USING EVALUATION VALUES

This is a continuation of application Ser. No. 12/100,588, filed Apr. 10, 2008, which is entitled to the priority filing date of Japanese application(s) 2007-105065, filed on Apr. 12, 2007, the entirety of which is incorporated herein by reference.

CROSS REFERENCES TO RELATED APPLICATIONS

The invention contains subject matter related to Japanese Patent Application JP 2007-105065 filed in the Japanese Patent Office on Apr. 12, 2007, the entire contents of which being incorporated herein by reference.

BACKGROUND OF THE INVENTION

1. Field of the Invention

The invention relates to an auto-focus apparatus, an image pickup apparatus, and an auto-focus method capable of automatically adjusting a focus on a subject with accuracy (hereinafter called "in-focus") based on evaluation values obtained by image data processing.

2. Description of the Related Art

A typical image pickup apparatus in the related art, such as camcorders or digital still cameras, includes an auto-focus control unit or AF (automatically adjusting focus) function for automatically adjusting the focus on a subject. A user can either select imaging the subject with a manual focus or an autofocus functions provided for the image pickup apparatus.

Japanese Unexamined Patent Application Publication No. 2003-241077, for example, discloses a lens system that adjusts a focus on a subject manually, and further adjusts the focus with the aforementioned autofocus function thereafter. A type of the focus adjustment is switched manually in the lens system.

SUMMARY OF THE INVENTION

For example, when a user sets the camcorder to a manual-focus operation mode to adjust a focus on a subject manually, the user usually adjust the focus on the subject while viewing the subject image via viewfinder. Existing camcorder models typically have small viewfinder displays each having approximately two-inches at the largest. It is generally difficult to adjust a focus on the subject using a viewfinder having a small display, and the difficulty will become more obvious when the subject image, the focus of which has once been adjusted by observing the viewfinder having a small display, is displayed by a high definition display. In other words, the focus on the subject image appears to have been adjusted on the small screen display of an electric viewfinder; however, in reality, it becomes obvious that the focus has not been adjusted when the subject image is displayed on the high-definition display having approximately four-inches.

In contrast, when the user sets the camcorder an auto-focus operation mode, the focus is automatically adjusted on the subject displayed on a screen of the viewfinder without fail; however, a detecting area is generally set to the center of the screen. In this case, the detecting area does not necessarily match with the subject on the screen on which the user tries to adjust a focus.

Embodiments of the invention have attempted to provide an auto-focus apparatus, image pickup apparatus, and auto-focus method capable of obtaining an accurate focus adjustment using both manual-focus and auto-focus processing.

According to embodiments of the invention, attempts have been made to provide an auto-focus apparatus utilized for an image pickup apparatus having a focus ring. The auto-focus apparatus includes an evaluation value calculator periodically calculating a plurality of evaluation values for a plurality of areas of a subject image based on high frequency components of image signals of the plurality of areas of the subject image; and a control unit, after detecting that the focus ring has been stopped, performing image processing on an area of the subject image where fluctuations of the evaluation values obtained just before the focus ring has been stopped exhibit a predetermined history, based on an evaluation value obtained in the area of the subject image exhibiting the predetermined history, and outputting instruction signals for moving a focus lens base on a peak of the evaluation values obtained by the image processing.

According to an embodiment of the invention, a user manually first adjusts a focus on a subject, the auto-focus mechanism automatically detects the subject and image processed so as to adjust final precision of the focus on the subject According to an embodiment of the invention, the user can manually first adjust a focus on a subject, and optionally activate an auto-focus function to adjust the focus on appropriate areas of the subject image.

BRIEF DESCRIPTION OF THE DRAWINGS

FIG. 5 is a flowchart illustrating focus processing according to one embodiment of the invention.

DESCRIPTION OF THE PREFERRED EMBODIMENTS

Preferred embodiments of the invention will be described in detail in accordance with accompanied drawings.

Figure 1:
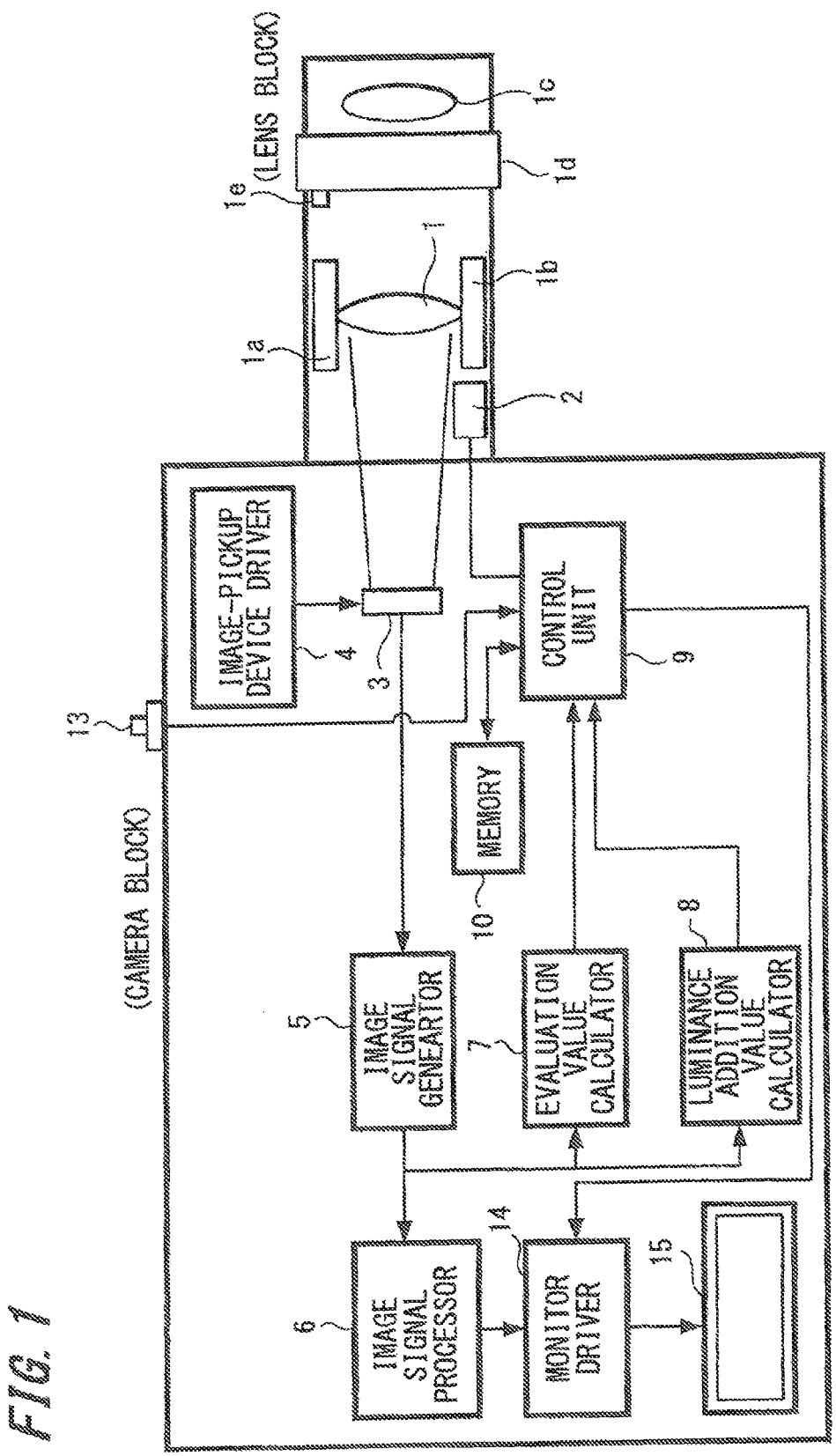
FIG. 1 is a block diagram illustrating a configuration of a camcorder according to one embodiment of the invention.

FIG. 1 illustrates a configuration of an image-pickup apparatus having an auto-focus mechanism according to one embodiment of the invention, such as a camcorder. The camcorder shown in FIG. 1 is one model capable of switching focus operation between manual and auto-focus operation utilizing an AF image processing mechanism. A lens block of the camcorder includes a lens group having an image-pickup lens $1c$ and a focus lens $1$; a position detector $1a$; a lens mechanism $1b$; a lens driver $2$; a focus ring $1d$; and an encoder $1e$. A camera block includes an image-pickup device $3$, an image-pickup device driver $4$, an image signal generator $5$, an image signal processor $6$, an evaluation value calculator $7$, a luminance addition value calculator $8$, a control unit $9$, a memory $10$, and a switch $13$.

The lens block of the camcorder includes a lens group having an image-pickup lens 1c and a focus lens 1 configured to focus a subject image incident on the image-pickup lens 1c of an image-pickup surface of the image pickup device, a position detector configured to detect positions of each lens, a lens driving mechanism for driving each lens, and a lens driver configured to control movements of the lens driving mechanism. Lenses other than the focus lens 1 and the image-pickup lens 1c such as a wobbling lens which is utilized for determining directions of a focus position are omitted from the lens block shown in FIG. 1.

The focus lens 1 includes the position detector 1a configured to detect positions of the focus lens 1, namely a focus position, the lens driving mechanism 1b configured to move the positions of the focus lens in the direction of an optical axis, and the lens driver 2 configured to control movements of the lens driving mechanism 1b. Likewise, the wobbling lens (not shown) includes a wobbling lens driving mechanism for moving the position detector 1a and the position of the lens in the direction of an optical axis in order to perform appropriate wobbling. The lens block further includes an iris or diaphragm (not shown) for controlling the amount of incident light. The iris includes an iris position detector configure to detect an aperture of the iris, and an iris driving mechanism for opening and closing the iris. Notice that the focus lens can also be utilized as the wobbling lens in this embodiment.

A focus ring 1d is utilized for manually adjusting a focus of the camcorder on the subject. The focus on the subject can manually be adjusted by turning the focus ring 1d. Degrees of a turn of the focus ring 1d can be detected by an encoder 1e, and the detected degrees are converted into a pulse signal by an encoder counter (not shown). The converted pulse signal is then output to the control unit 9.

The lens driver 2 is supplied with various detected signals from the position detector 1a, such as a signal indicating a focus position, a signal indicating an amount of wobbling, and a signal indicating the aperture of the iris. The lens driver 2 including a lens CPU and a lens drive circuit is configured to move a focus (focal point) of the focus lens 1 according to instructions transmitted from the control unit 9. The lens driver 2 is connected with a user interface (not shown) for setting an auto-focus mode or initiating the auto-focus operation, so that the lens driver 2 is supplied with operation signals according to operation of the user interface. The lens driver 2 includes a storage (not shown) utilizing a ROM or EEPROM, on which information is stored, such as focal length data of the focus lens 1 and the wobbling lens, aperture ratio data, the name of manufacturer, and the serial number of the manufacturer.

The lens driver 2 generates a lens driving signal based on the stored information, detected signals, and the later-described focus control signal or wobbling control signal supplied from the control unit 9. The lens driver 2 also supplies the generated driving signal to the lens driving mechanism 1b, so that the focus lens 1 is moved to a position where a sired focus on the subject image is obtained. The lens driver 2 supplies the generated lens driving signal to the wobbling lens driving mechanism to wobble the wobbling lens so that the focus lens 1 will detect a direction of an in-focus position. The lens driver 2 further generates an iris driving signal to control the aperture of the iris.

In the camcorder shown in FIG. 1, the subject image is formed on the image-pickup device 3 via the focus lens 1, is then photo-electrically converted into an electric signal by the image-pickup device 3. The resulting signal is then output to the image generator 5 located subsequent to the image-pickup device 3. The image-pickup device 3 may include a CCD (Charge Coupled Devices), CMOS (Complementary Metal Oxide Semiconductor), and the like. The image-pickup device driver 4 is one example of the image-pickup device drive circuit that supplies a driving signal to the image-pickup device 3 for photo-electronically converting the subject image formed on the image-pickup device 3 into an electric signal. The driving signal is supplied to the image-pickup device 3 based on a vertical synchronization signal VD, a horizontal synchronization signal HD, and a clock signal CLK generated from a clock signal generator (not shown), which are all used for a standard operation for components of the camcorder.

In the image signal generator 5, an electric signal output from the image-pickup device 3 is subject to appropriate signal processing to generate an image signal complied with a predetermined standard. The image signal is transmitted to a circuit group (image signal processor 6) subsequent to the camcorder while being input to the evaluation value calculator 7. The evaluation value calculator 7 filters a high frequency component of an image signal in a specific region provided within an image-pickup frame, and calculates an evaluation value relative to the image contrast. While imaging a typical subject, an evaluation value increases as the subject image approaches in-focus state, and the evaluation value reaches the relative maximum when the subject image is in-focus. The aforementioned evaluation value is updated once for one field of an image signal. Auto-focus operation using evaluation values is well-known technology in the art, one example of which is described in detail in Japanese Unexamined Patent Application Publication No. 10-213736 previously disclosed by the applicant of the invention.

The aforementioned processing is performed for each of three primary colors R (Red), G (Green), and B (Blue). For example, the camera block includes a color separating prism (not shown). The color separating prism separates light incident from the lens block into the three primary colors R, G, and B, and supplies the R component light to R component image-pickup device, the G component light to G component light to G component image-pickup device, and the B component light to B component image-pickup device, respectively. In FIG. 1, the three R, G, and B component image-pickup devices are represented as an image-pickup device 3.

The subject image having the tree colors formed on the image-pickup device 3 is subject to predetermined processing before the subject image is photo-electrically converted into a signal by the image-pickup device 3 and output to the image signal generator 5. The image signal generator 5, for example, includes a preamplifier (not shown) and an A/D (Analog/Digital) converter. The level of the electric signals input to the image signal generator 5 is amplified by the preamplifier, and correlated double sampling is performed on the signals to eliminate a reset noise, and the A/D converter converts an analog signal into a digital image signal. Further, the image signal generator 5 is configured to perform gain control, black level stabilizer, or dynamic range control, and the like of the supplied image signals for each color, and supply the thus obtained image signals to the image processor 6, the evaluation value calculator 7, and the luminance addition value calculator 8.

The image signal generator 6 performs various signal processing on the image signals supplied from the image signal generator 5, and generates output image signals. The various signal processing includes knee correction to compress image signals having a level equal to or higher than a certain level, gamma correction to correct the level of the image signal based on a configured gamma curve, and white clip processing or black clip processing to control the level of the image signal to fall within a predetermined range. The image signal generator 6 also performs edge enhancement or linear matrix processing, and encodes processing for generating the output image signal with a desired format.

The evaluation value calculator 7 filters the high frequency component using image signals in a specific region provided within the image pickup frame to calculate an evaluation value ID corresponding to the image contrast and supply the calculated evaluation value ID to the control unit 9.

Notice that those processing performed at the image signal generator 5 having such as a preamplifier and an analog-digital (A-D) converter, the image signal processor 6, the evaluation value calculator 7, and the like employ the vertical direction synchronization signal VD, the horizontal direction synchronization signal HD, and the clock signal CLK supplied from units located prior to the image signal generator 5, the image signal processor 6, the evaluation value calculator 7 in order to perform the respective processing. Alternatively, these signals may be obtained from the clock signal generator.

Figure 2:
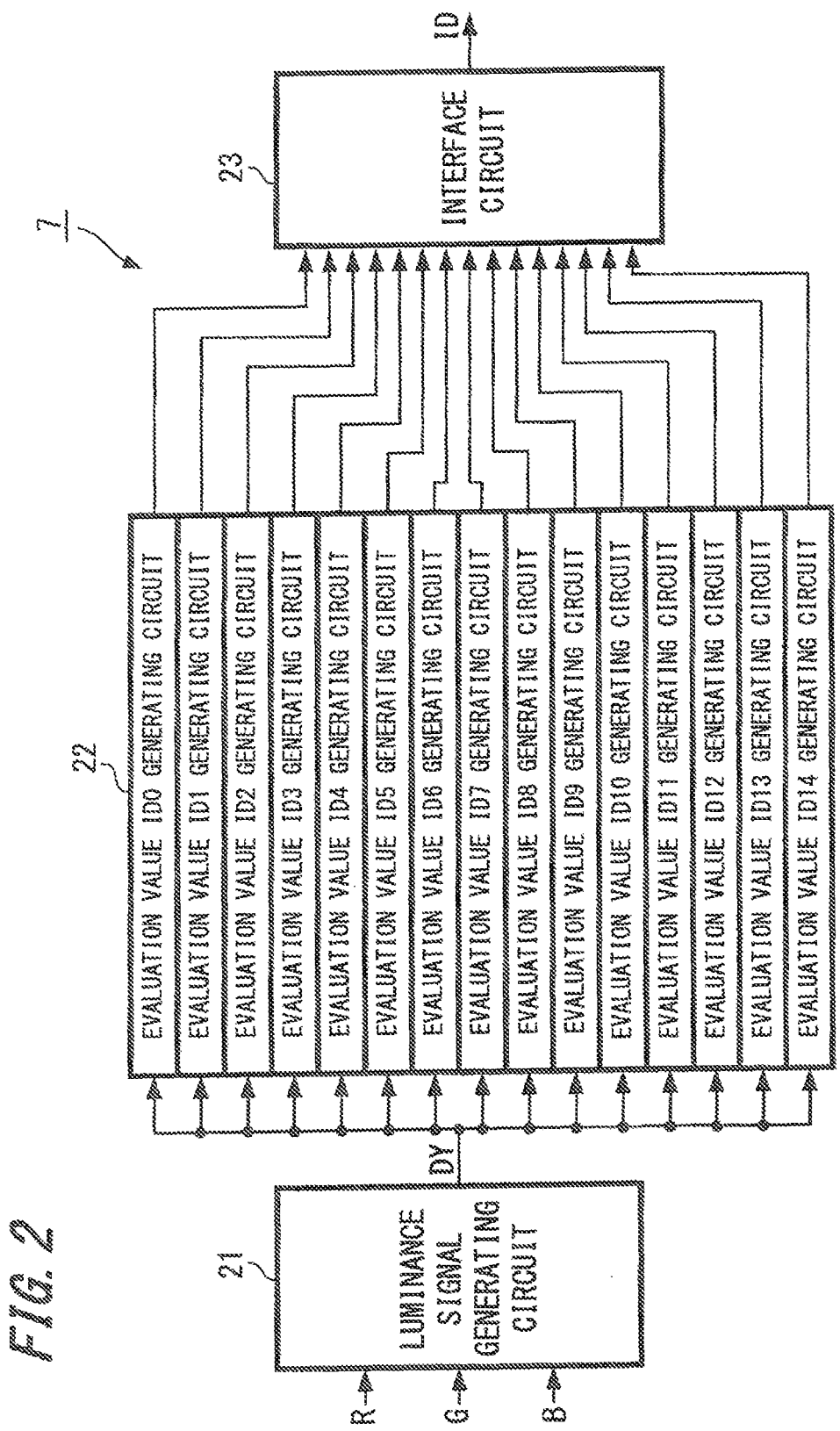
FIG. 2 is a diagram illustrating a configuration of an evaluation value calculator.

The evaluation value calculator 7 is described more in detail below. FIG. 2 illustrates a configuration of the evaluation value calculator 7. The evaluation value calculator 7 includes a luminance signal generation circuit 21 to generate a luminance signal DY based on an image signal for each color, the evaluation value generation circuit 22 to generate 15 evaluation values ID0 to ID14 as described below, and an interface circuit 23. The interface circuit 23 is configured to communicate with the control unit 9 and supply the generated evaluation values according to requests from the control unit 9.

The image signal generator 21 performs the following operation: $DY=0.30R+0.59G+0.11G$ using the image signals R, G, B supplied from the image signal generator 5 and generate a luminance signal DY. The luminance signal DY is generated in this manner, because it is sufficient to simply detect changes in the level of contrast and determine whether contrast is high or low in order to determine whether a subject image is in-focus or out of focus. Notice that the aforementioned operational expression of the luminance signal DY is not limited thereto, and various other expressions can also be applied.

The evaluation value generator 22 generates 15 evaluation values ID0 to ID14. The evaluation values ID0 to ID14 are obtained by summing the frequency components of image signals in a specific region (hereinafter called "evaluation frame") provided within the image pickup frame, and provide values corresponding to the blurring of the image. These evaluation values are essentially the results of summing the frequency components of image signals in a specific region provided in a image pickup frame (hereafter called the "evaluation frame"), and provide values corresponding to the blurring of the image.

The data used for calculating evaluation values include two types, namely, IIR-type and Y-type data. IIR-type data includes high-frequency components filtered from the luminance signal DY by a HPF (high-pass filter); whereas Y-type data includes original luminance signal DY.

The HPF used above is an IIR-type (infinite impulse response type) HPF. The evaluation values are divided into IIR0, IIR1, IIR3, and IIR4, based on the types of HPF. This implies that each type of HPF has a different cutoff frequency. Accordingly, the evaluation values can be obtained with HPFs having different cutoff frequencies. For example, the evaluation value obtained using a HPF having a high cutoff frequency can exhibit a significant change in the vicinity of the focus position as compared with the case of using a HPF with a low cutoff frequency. In addition, when the pickup image is largely out of focus, the evaluation value obtained using a HPF having a low cutoff frequency can exhibit a significant change as compared with the case of using a HPF with a high cutoff frequency. Thus, the evaluation value generator 22 includes HPFs having different cutoff frequencies in order to select the optimal evaluation value based on the current focus state in auto-focus operation.

Figures 3, 4:
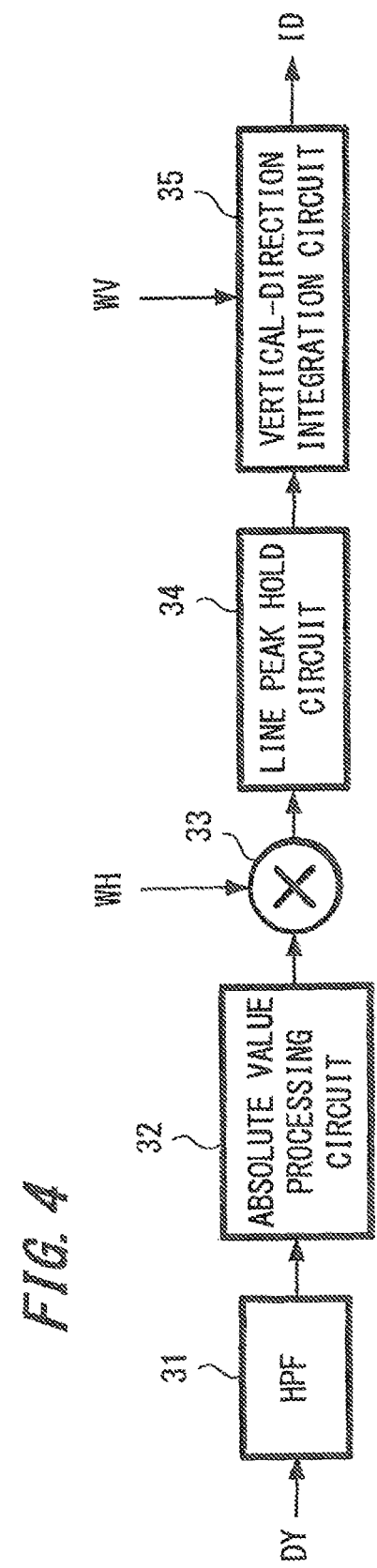
FIG. 3 is a diagram illustrating one example of how an image picked up is divided by frames.
FIG. 4 is a diagram illustrating a configuration of a horizontal direction evaluation value calculating filter.

An image pickup frame 40 can, for example, be divided into 15 areas (a0 to a4, b0 to b4, c0 to c4) having three rows and five columns as shown in FIG. 3. The size of the evaluation frame or the size of the image region, which is used for generating evaluation values, can be determined based on the size of the image pickup frame 40 and the number of divisions. The above embodiment illustrates 15 divisions as one example; however, the number of divisions of the image pickup frame 40 is not limited thereto, and any number of divisions can also be employed.

Thus, the image pickup frame 40 is divided into a plurality of frames to generate the evaluation values corresponding to the frame sizes. Hence, an appropriate evaluation value can be obtained by assigning one of the evaluation values ID0 to ID14, regardless of the position of the target subject in the image pickup frame.

As disclosed in Unexamined Patent Application Publication No. 10-213736, there are a plurality of evaluation value calculation methods including the HPeak, HIntg, VIntg, and Satul. The HPeak system implies calculating horizontal evaluation values by the peak system; the HIntg system includes calculating horizontal evaluation values by the whole integration system; the VIntg system involves calculating vertical-direction evaluation values by the integration system, and the Satul system includes calculating the number of data indicating saturated luminance. Here, the evaluation calculation method by the HPeak system (horizontal evaluation value calculation) will be described as one example utilized in an embodiment; however, the evaluation calculation method is not limited to this example.

The HPeak method involves one of the evaluation value calculation methods with which the high frequency component is filtered by a HPF from the horizontal image signal. FIG. 4 shows a configuration of a horizontal-direction evaluation value calculation filter used for the HPeak method. The horizontal-direction evaluation value calculation filter includes a HPF 31 that filters only high-frequency components from the luminance signals DY of the luminance signal generation circuit 21; an absolute value processing circuit 32 that selects the absolute values of the high-frequency components; a multiplication circuit 33 that multiplies the absolute values of the high-frequency components by the horizontal-direction frame control signal WH; a line peak hold circuit 34 that holds one peak value per line; and a vertical-direction integration circuit 35 that integrates the peak values for all the lines in the evaluation frame in the vertical direction.

The high-frequency components of the luminance signals DY are filtered by the HPF 31, and then converted into absolute values by the absolute value processing circuit 32. Subsequently, the horizontal-direction frame control signal WH is multiplied by the multiplication circuit 33 to obtain absolute values of high-frequency components within the evaluation frame. That is, if frame control signals WH the multiplication value of which is "0" outside the evaluation frame are supplied to the multiplication circuit 33, then only the absolute values of horizontal-direction high-frequency components within the evaluation frame are supplied to the line peak hold circuit 34. Here, the frame control signals WH in the vertical direction form a square wave; however, the frame control signals WH in the horizontal direction do not merely include characteristics of a mere square wave but include characteristics of a triangular wave, so that the multiplied value of the frame control signals WH is reduced in the periphery of the frame (both ends). As a result, as the subject image within the frame approaches being in-focus, it is possible to reduce effects caused by the subject image interfering the external edges around the periphery of the frame (high luminance edges in the evaluation frame, including noise, drastic change, or the like of the evaluation values) or variation in the evaluation values caused by the movement of the subject can be decreased. The line peak hold circuit 34 holds the peak values for each line. The vertical-direction integration circuit 35 adds peak values held for each line within the evaluation frame in the vertical direction, based on vertical-direction frame control signals WV, thereby obtaining the evaluation value. This method is called the HPeak method, because horizontal-direction (H) peaks are held temporarily.

The configuration of the camcorder is described by referring back to FIG. 1. The evaluation value calculator 8 is a circuit configured to integrate the luminance of the image signals in the specific region obtained by the image pickup device and generate the luminance addition value. The evaluation value calculator 8 adds the luminance signals in a specific region obtained from image signals for each color input from the image signal generator 5, and the added result is output to the control unit 9 as the luminance addition values.

The control unit 9, for example, includes a CPU (Central Processing Unit), RAM (Random Access Memory), and ROM (Read Only Memory), and retrieves computer programs stored in the ROM onto the RAM to run the programs, and hence a predetermined control and processing such as auto-focus operation are performed. The control unit 9 obtains evaluation values calculated by an evaluation value calculator 7 once for each field, and searches the peak of the evaluation values. The auto-focus operation is carried out when the control unit 9 detects that the focus lens has stopped or the manual focus operation has stopped. Alternatively, the auto-focus operation is performed using an instruction as a trigger from a one-shot switch 13 that directs activation of the auto-focus operation.

The control unit 9 and the lens driver 2 of the lens block are configured such that the control unit 9 and the lens driver 2 may communicate with each other using predetermined formats and protocols, and collaborate to control the auto-focus operation. The lens driver 2 supplies various information including a focus position or a value indicating the size of an iris to the control unit 9 upon request. The lens driver 2 generates a lens drive signal based on a focus control signal or wobbling control signal supplied from the control unit 9 to perform drive processing of the focus lens 1 and wobbling lens. The control unit 9 generates the focus control signal to drive control the focus lens 1 or the wobbling control signal to drive control the wobbling lens, and supplies the respective signals to the lens driver 2, based on the evaluation value ID calculated by the evaluation calculator and the various information retrieved from the driver 2.

Each of the lens driver 2 and the control unit 9 incorporates a microcomputer and a memory to perform the auto-focus operation by retrieving to run a program stored in the non-volatile memory.

A memory 10 is a storage unit into which data are written and from which data are read out by the control unit 9. The storage unit is configured to store information such as the focus position of the focus lens 1 and the evaluation value calculated by the evaluation value calculator 7. The memory 10 includes a non-volatile memory such as semiconductor memories.

A liquid crystal monitor driver 14 is configured to generate an image signal output from a signal processor 6 and drive signals for displaying characters, icons, or the like on a monitor 15 directed by the control unit 9. The drive signal is supplied to a viewfinder 15 based on respective synchronization signals and the clock signal included in the image signals.

The viewfinder 15 is one example of display units, for which a liquid crystal display device (LCD) may be used. The viewfinder 15 receives drive signals supplied from the monitor driver 14 to display images according to supplied signals. The viewfinder 15 may be a monitor provided with a camcorder.

Next, focus adjustment processing performed in an camcorder will be described according to an embodiment of the invention. Basically, a user manually adjusts a focus on a subject; the auto-focus mechanism then automatically detects the manually focused subject and image processing the subject image to adjust the final precision of the focus. The algorithm to cause the auto-focus mechanism to function roughly has the following two processes.

(1) Frame Selection

Compute the area to which the target subject displayed based on the focusing fluctuations of the subject image while the user is manually operating the focus ring 1*d*.

(2) AF Operation

Carry out an auto-focus operation on the area specified by the (1)

The above two processes are described in detail with reference to a flowchart shown in FIG. 5. First, the control unit 9 detects a manually focusing operation status from an encoder value of the focus ring 1*d* detected by an encoder 1*e* (step S1). The control unit 9 stores the encoder value in the memory 10, and then acquires a fluctuation history data (step S2). The control unit 9 determines whether a user has started or stopped the focus ring operation based on the fluctuation history data. The control unit 9 is continuously monitoring which area (detecting frame) of the image is most approaching the in-focus position, based on the focal change of the image picked up by the image pickup device 3 while the focus ring 1*d* is being operated (steps S3, S4).

The control unit 9 determines the area (detecting frame) that is subjected to the final precision adjustment of the focal point just after having detected the end of the focus ring operation (step S5). In this embodiment, the control unit 9 selects the detecting frame based on the history of the evaluation value fluctuations obtained just before the user has stopped the focus ring. The control unit 9 then carries out auto-focus processing using image processing, based on the evaluation value obtained in the selected area (detecting frame) (step S6). The level and fluctuations of the evaluation value are controlled so that the distance between the current focus position and the focus position obtained on activating auto-focus processing is not largely changed. Described is the method for controlling the level or fluctuations of the evaluation values.

The detecting frame of the embodiment differs from those set in the center of the screen that are utilized for an ordinary auto-focus or one-shot auto-focus processing. The detecting frame of the embodiment is set after dividing a screen into a plurality of frames. The control unit 10 monitors histories of the evaluation values of the respective detecting frames while the user manually operates the focus ring, and selects a detecting frame with a subject image in which significant fluctuations of the evaluation values are detected. Then, autofocus processing utilizing image processing algorithm can be performed on the detecting frame selected.

Figure 6A:
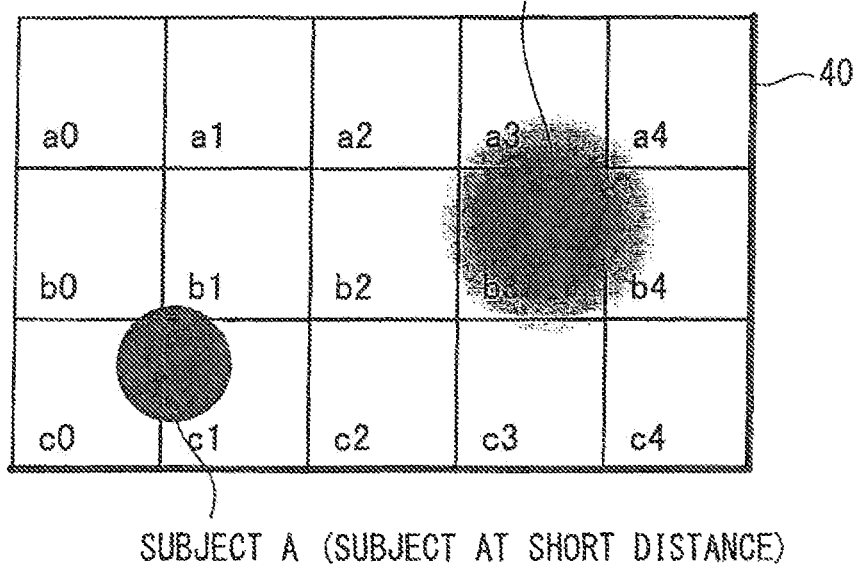
FIGS. 6A, 6B are diagrams each illustrating one example of how an image picked up is divided by frames.
Figure 6B:
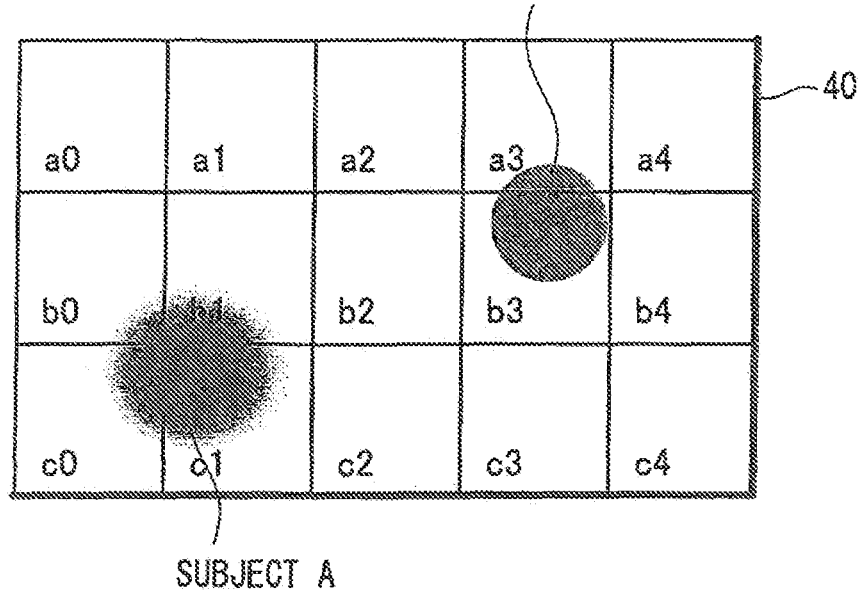
Figure 7:
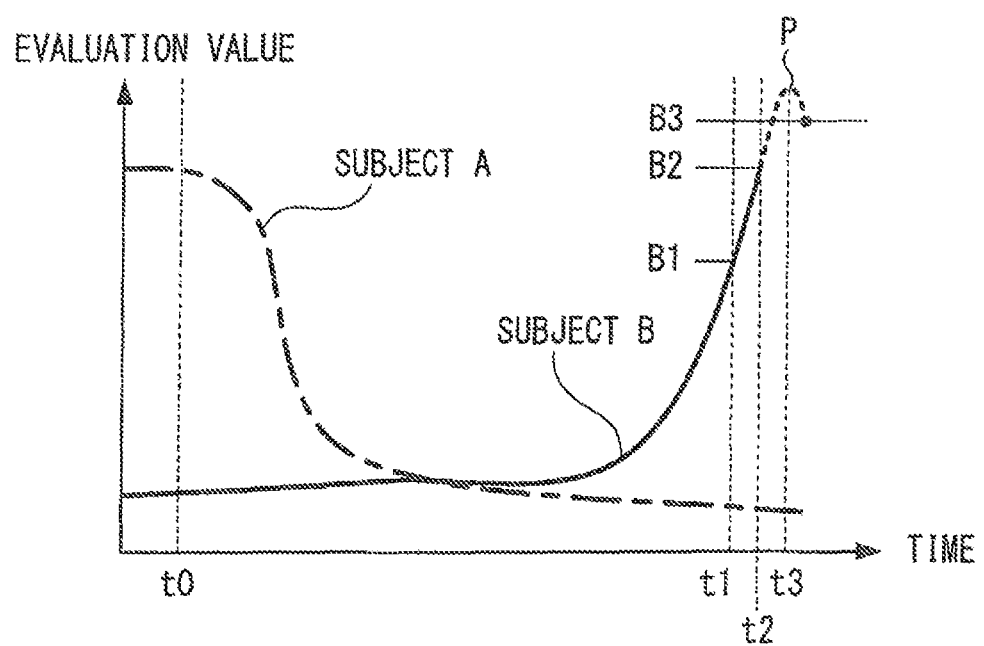
FIG. 7 is a diagram illustrating one example of fluctuations of an evaluation value with time while a focus ring is operated.

Here, how the control unit 9 estimates an area (detecting frame) that will eventually be in-focus position at step 3 is described in detail. FIGS. 6A, 6B are diagrams each illustrating one example of how a picked up image is divided by frames. In these figures, a subject in-focus is illustrated with a small representation, and a subject out-of-focus is illustrated with a large representation. FIG. 7 is a diagram illustrating fluctuations of an evaluation values with time while a focus ring is operated.

As described above, the image obtained from the image pickup device 3 is divided into 15 areas, for respective of which evaluation values are computed. An image pickup frame 40 can, for example, be divided into 15 areas (a0 to a4, b0 to b4, c0 to c4) having three rows and five columns as shown in FIGS. 6A, 6B. It is preferable that the number of frames to be divided is optimally determined according to the capacity of the evaluation value calculator 7. Note that the image pickup frame is divided for setting areas (evaluation frames) so that the evaluation values are computed in each of the divided areas. Thus, the user may not need paying any attention to the divided areas (evaluation frames) while viewing the viewfinder.

The evaluation values in the divided areas (detecting frames) can simultaneously be computed by the evaluation value calculator 7. Alternatively, the evaluation values in the divided areas (detecting frames) can be computed in sequence according to a predetermined rule by an evaluation value calculator 7. For example, the evaluation values in the areas from a0 to c4 can be computed in sequence per one field. In this case, the number of areas for computing evaluation values that can be afforded by the evaluation value calculator 7 alone can exceed the capacity thereof.

The evaluation value calculator 7 periodically obtains high frequency components (evaluation values) of image signals in the divided areas. The evaluation value increases when the subject image approaches an in-focus state. More details can be described with reference to a subject A positioned at a short distance and a subject B at a long distance in FIGS. 6A, 6B. In a case where a user tries to adjust a focus on a subject at a short distance as shown in FIG. 6A, the evaluation value in the area c1 containing the subject image A with in-focus state is high, whereas the evaluation value in the area b3 containing the subject image B with out-of-focus state is low (see FIG. 7).

When the user tries to adjust the focus on a subject at a long distance from the subject at the short distance as shown in FIG. 6B, the evaluation value in the area b3 containing the subject image B approaching in-focus state significantly increases, whereas the evaluation value in the area c1 containing the subject image A becoming out-of-focus state significantly decreases (see FIG. 7).

The user moves the focus ring 1d close to the position where the user desires the subject B to be in-focus, and then stops operating the focus ring 1d (t2). The evaluation value output from the evaluation value calculator 7 fluctuates as the user moves the focus ring 1d, and the area where the evaluation value significantly increases just before the focus ring 1d has stopped can be estimated as the area where the user desires the subject to be in-focus. Note that the memory 10 constantly stores the images obtained at several fields back to the past, and hence the evaluation value just before the focus ring has stopped can be obtained by computing these images.

There may, for example, be two methods for evaluating histories of the evaluation values obtained just before the focus ring has stopped. The first method is evaluating the histories based on increments in the evaluation values obtained just before the focus ring has stopped; and the second method is based on whether or not the relative maximum of the evaluation values is detected in the duration between the time just before the manual focus ring operation has been stopped and the time the focus operation has stopped.

For example, as shown in FIG. 7, when B2 represents the evaluation value obtained when the focus ring has stopped (t2), B1 represents the evaluation value obtained at the predetermined number of fields back to the past (t1), fluctuations in the evaluation values obtained just before the focus ring has stopped can be represented by the following equation: Increments k2=B2/B1. Accordingly, the control unit 9 determines the area having a history where the significant increments of the evaluation values are detected just before the focus ring has stopped as the area where the user desires the subject to be in-focus.

The first method is especially effective when the evaluation values just before the focus ring has stopped continuously increase. For example, suppose that the focus ring operation has stopped at the time t3 in FIG. 7. In this case, the evaluation value obtained when the focus ring operation has stopped at the time t3 is B3, the fluctuations or increments in the evaluation values obtained just before the focus ring has stopped can be represented by the following equation: Increments k3=B3/B2. Although the evaluation value B2 is larger than B3 (i.e., B2>B3), the increments k3 obtained when the focus ring operation has stopped at the time t3 is lower than the increments k2 obtained when the focus ring operation has stopped at the time t2. Therefore, the control unit 9 may not determine the area having the history where the significant increments of the evaluation values are detected just before the focus ring has stopped as the area where the user desires the subject to be in-focus.

In the second method, the histories of the evaluation values are evaluated based on whether or not the relative maximum of the evaluation values is detected in the duration between the time just before the manual focus ring operation has been stopped and the time the focus operation has stopped. In the example shown in FIG. 7, the control unit 9 detects the relative maximum P before the focus ring operation has bee stopped, and determines the area having a history where the relative maximum of the evaluation values has been detected as the area where the user desires the subject to be in-focus. In this manner, even though the user wrongly operates the focus ring to miss the in-focus position (i.e., the evaluation value P), the control unit 9 can still determines the area where the user desires the subject to be in-focus.

Note that if the ratio (relative maximum/evaluation value at the start of focus operation) of the evaluation value at the start of the auto-focus operation to the relative maximum of the evaluation values is equal to or less than a predetermined value such as noise, the method where the relative maximum is detected can be invalidated. As a result, wrong detection of the area where the user desires the subject to be in-focus due to noise can be prevented.

Next, how auto-focus processing is performed on the area that the control unit has estimated as the area where the user desires the subject to be in-focus at step S6 is described in detail. In this step, auto-focus processing is once performed on the area selected, as an auto-focus processing area, based on the fluctuation history of the evaluation value obtained just before the focus ring has stopped. The auto-focus processing herein implies image processing system utilizing evaluation values as auto-focus algorithm in the related art.

Note that the focus of the subject image in the selected area is already adjusted close to the in-focus position. Therefore, it may not be necessary to move the focus of the subject image from the position at the activation of the auto-focus processing. The following processing is performed so as to prevent the user from obtaining undesired focus position.

The range of the focus adjusting area is limited based on the focus position obtained at the activation of auto-focus processing. The focus adjusting area can be limited based on the range of the focus adjusting area, the multiple of focal depth, and the range of the focus adjusting time. Thus, undesired focus position that differs from the focus position obtained by the users manual adjustment can be prevented.

When the focus is adjusted within the aforementioned limitation; that is, when the peak of the evaluation values is detected, the auto-focus processing terminates at that point. The optimal focus position can be obtained accordingly.

In contrast, when the focus is not adjusted within the aforementioned limitation; that is, when the peak of the evaluation values is not detected, the focus position moves back to the position at the activation of the auto-focus processing, and the auto-focus processing terminates thereafter. In this case, the focus position will eventually be the manually adjusted position; however, the user can at least maintain the desired focus position of the subject image.

In the embodiments of the invention, the user can manually adjust the focus on a subject image as she or he desires, and once the user approximately adjusts the focus on the desired subject, the auto-focus processing is performed on the subject image to adjust the focus more precisely.

It should be noted that the present invention is not limited to the above-described embodiments; for example, an image capture apparatus according to the embodiments of the present invention can be applied to a digital camera in place of the above-described video camera, and various other changes and modifications can of course be made without deviating from the gist of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An auto-focus apparatus utilized for an image pickup apparatus having a focus moving mechanism which is manually adjustable comprising:
   an evaluation value calculator periodically calculating a plurality of evaluation values for a plurality of areas of a subject image based on high frequency components of image signals of the plurality of areas of the subject image; and
   a control unit, after detecting that the focus moving mechanism has been manually stopped, (a) performing image processing on an area of the subject image, where fluctuations of the evaluation values obtained just before the focus moving mechanism has been manually stopped exhibit a predetermined history, based on the evaluation values obtained in the area of the subject image exhibiting the predetermined history, and (b) outputting auto-focus instruction signals to a lens driver for automatically moving a focus lens based on a peak of the evaluation values obtained by the image processing.

* * * * *